United States Patent [19]

Moore et al.

[11] Patent Number: 4,623,678

[45] Date of Patent: Nov. 18, 1986

[54] METHOD FOR SHEAR COAGULATION OF LATEX RESINS

[75] Inventors: Eugene R. Moore, Midland; Norman A. Lefevre, Bay City, both of Mich.

[73] Assignee: The Dow Chemical Company, Midland, Mich.

[21] Appl. No.: 727,970

[22] Filed: Apr. 26, 1985

[51] Int. Cl.⁴ .............................. C08J 3/02; C08J 3/16
[52] U.S. Cl. ............................ 523/335; 260/DIG. 22; 521/72; 523/352; 528/936
[58] Field of Search .................... 528/936; 521/72; 260/DIG. 22; 523/335, 352

[56] References Cited

U.S. PATENT DOCUMENTS

| | | | |
|---|---|---|---|
| 1,989,241 | 1/1935 | McGavack | 18/50 |
| 2,467,054 | 4/1949 | Rumbold | 260/DIG. 22 |
| 2,576,318 | 11/1951 | Toulmin | 521/72 |
| 2,786,879 | 3/1957 | Kennedy et al. | 260/763 |
| 2,984,631 | 5/1961 | Talalay et al. | 521/72 |
| 2,993,020 | 7/1961 | Carpenter | 260/DIG. 22 |
| 3,032,524 | 5/1962 | Brewer | 260/29.7 |
| 3,245,970 | 4/1966 | Drayer | 260/91.7 |
| 3,459,693 | 8/1969 | Halper et al. | 524/394 |
| 3,663,462 | 5/1972 | Arndt et al. | 521/72 |
| 4,287,312 | 9/1981 | Yusa et al. | 525/83 |
| 4,299,952 | 11/1981 | Pingel et al. | 528/502 |
| 4,302,377 | 11/1981 | Gurak et al. | 260/29.7 |
| 4,419,496 | 12/1983 | Henton et al. | 525/301 |

*Primary Examiner*—Herbert S. Cockeram
*Attorney, Agent, or Firm*—Harness, Dickey & Pierce

[57] ABSTRACT

In accordance with the present invention, solids are recovered from a latex stabilized with a pH sensitive emulsifier by passing carbon dioxide through the latex to lower the pH and thereby destabilize the latex and then subjecting the latex to high shear.

24 Claims, No Drawings

METHOD FOR SHEAR COAGULATION OF LATEX RESINS

BACKGROUND OF THE INVENTION

The present invention relates to latex resins and, more particularly, to an improved method for shear coagulation of latex resins. The method is especially useful for shear coagulation of a latex of an acrylonitrile-butadiene-styrene, i.e., ABS, type resin.

Shear coagulation is a known step in recovering synthetic resinous solids from a latex obtained, for example, from conventional emulsion polymerization processes. Such processes are used in the manufacture of polymers such as rubber modifiers and rubber-modified polymers such as acrylonitrile-butadiene-styrene, acrylonitrile-methacrylate-butadiene-styrene, methacrylate-butadiene-styrene, toughened styrene/maleic anhydride, styrene maleimide and poly(methyl methacrylate). For example, a conventional emulsion polymerization process involves steps of preparing a rubber latex by emulsion polymerization, polymerizing monomers in the presence of the rubber latex and then recovering latex rubber solids. The emulsion polymerization method allows good control of particle size and size distribution, degree of grafting and cross-linking of the rubber, and generally, of the structure and properties of the final polymeric product.

Rubber particles of small particle size (less than 1,000 Angstrom (Å) diameter) are easy and fast to produce and tend to provide formed articles having high gloss. But small size particles also tend to provide formed articles having reduced impact resistance. Thus, in many instances it is desirable to obtain compositions possessing a balance in properties by having a distribution of rubber particles ranging from relatively large to relatively small; i.e., a polydisperse particle size distribution. Rubber particle size and distribution can be controlled by adjusting surfactant concentration during polymerization or by a method of agglomerating larger rubber particles from smaller ones. For example, U.S. Pat. No. 3,032,524, May 1, 1962 to Brewer discloses a method of freeze agglomerating a latex after lowering the pH of the latex by injecting a stream of an acidic gas, such as carbon dioxide, therethrough. Other procedures to effect limited or controlled agglomeration are taught in U.S. Pat. No. 4,419,496, Dec. 6, 1983 to Henton, et al. and in the numerous references cited therein.

Recovery and subsequent processing of the rubber or rubber-modified particles from the latex is generally accomplished by coagulation of the latex; i.e., by destabilizing the colloidal dispersion of rubber or rubber-modified particles in the latex. For example, U.S. Pat. No. 4,302,377, Nov. 24, 1981 to Gurak, et al. discloses a process for coagulation of an aqueous latex by adding aqueous solutions of inorganic acids or inorganic electrolytes thereto. Another conventional method for coagulation of a latex is that of shear coagulation such as is taught in U.S. Pat. No. 4,299,952, Nov. 10, 1981 to Pingel, et al. and in U.S. Pat. No. 3,459,693, Aug. 5, 1959 to Halper, et al.

Shear coagulation is a highly advantageous method of coagulation since it does not introduce contaminants into the product or process water. However, efficient shear coagulation is difficult to obtain. For example, in a conventional process it is necessary to add sufficient soap to the reactor to almost entirely coat the latex particle surfaces in order to have a clean reactor after producing the latex. If an insufficient amount of soap is added to the reactor, there is an unacceptable build-up on the reactor walls. However, the amount of soap required to avoid build-up on the reactor walls provides a latex which is too stable for efficient shear coagulation.

The present invention overcomes this problem and provides an improved method for shear coagulating latices. The method is efficient, is usable with a wide variety of latices, and minimizes the levels of deleterious, contaminating components remaining in the resin or process water. Addition of calcium chloride, alum, sulfuric acid or other nonvolatile material is not required for coagulation in the present process. Thus, the rubber or rubber-modified product recovered in accordance with the present invention has good light color, i.e., is not yellow, since no contaminants are introduced during shear coagulation step. Further understanding of the present invention will be had from the following disclosure wherein all parts are by weight unless otherwise indicated.

SUMMARY OF THE INVENTION

In accordance with the process of the present invention, solids are recovered from a latex stabilized with a pH sensitive emulsifier, and having a pH of above 7.5, by contacting the latex with gaseous carbon dioxide in an amount sufficient to destabilize the latex and then shear coagulating the latex. The process of the present invention is broadly applicable to latex resins, for example, of the styrene or styrene-butadiene or polyvinylidene chloride type and preferably of the styrene-acrylonitrile or acrylonitrile-butadiene-styrene type.

DESCRIPTION OF THE INVENTION

The instant invention concerns an improved method for coagulating latex resins. In accordance with the present invention, gaseous carbon dioxide is injected into the latex to lower the pH thereof and to destabilize the latex which is then shear coagulated. The present method is broadly applicable to latices of impact resistant polymer particles such as the well-known and extensively utilized high impact polystyrene (HIPS) particles, as well as the base SAN or PS particles or emulsion polymers containing a major amount of polyvinylidene chloride. More specifically, the present invention relates to an improved method for coagulating elastomer latices, particularly emulsion polymerized latices. The method of the present invention is especialy useful in conjunction with latices of acrylonitrile-butadiene-styrene (ABS) type particles.

Also contemplated within the scope of the invention are latex solids obtained by the method of this invention as well as fabricated articles made from the latex solids.

In accordance with the practice of the present invention a conventional recipe for emulsion preparation of latex solids such as a graft polymer compound is prepared, generally in an aqueous system, and brought to an alkaline pH, for example, from above 7.5 to about 12.0, more preferably, 9.0 to 11.0. The latex is stabilized in a conventional manner with a pH sensitive emulsifier. Then the pH of the latex is reduced to a pH of from about 6.0 to below 7.5, preferably from about 6.8 to 7.2, by the introduction of gaseous carbon dioxide into the admixture. Simultaneously with, or just subsequently to introduction of carbon dioxide, the latex is coagulated with high shear.

It will be appreciated that the present invention is advantageously efficient and economical. Carbon dioxide is an item of commerce and readily available in commercial quantities. Conventional means can be used to carry out the present method. Furthermore, the process of the present invention obtains almost 100% coagulation of latex solids. This process not only avoids waste of potential product by virtue of a high yield, but also leaves the reaction vessel relatively free of residue so that it can be used for a "next batch" without cleaning steps. Reactor cleanliness is enhanced because more of the stabilizing soap may be used during polymerization without the loss of coagulation yields. Also, there is no residue left in the reaction vessel to contaminate the next batch which promotes batch-to-batch consistency. Thus, another advantage of the present invention is that it facilitates use of sufficient emulsifier in the latex to avoid build up of latex solids on the reactor walls during polymerization.

In addition, the present invention avoids use of coagulating agents which leave unwanted ions in latex water or in the latex itself. Unwanted ions in latex water must be removed by burdensome and expensive processes. Residual ionic contaminents in the latex solids adversely effect the quality, particularly the color, of the final elastomer product. When $CO_2$ is employed as the coagulation or agglomerization agent in the practice of the present invention, it can be easily and cheaply removed, e.g., by placing the resulting product under heat, vacuum or sparging it with air.

LATICES

Latices with which the method of the present invention are useful are latex emulsions stabilized by means of a pH sensitive emulsifier. Especially suitable latices are those obtained by emulsion polymerization processes for graft polymers polymerized in the presence of a pH-sensitive emulsifier such as a fatty acid or rosin soap. The latex generally has a resin solids content of from about 5% to about 75% by weight, preferably from about 25% to 60% by weight. While particularly preferred latices are described in the examples, broadly speaking, latices which are useful in the present process include polystyrene latex, polymethyl methacrylate latices, polybutadiene latices, polyisoprene latices, various polymer and interpolymer latices including styrene and butadiene latices, vinyl chloride vinyl acetate copolymer latices, vinylidene chloride latices, vinyl chloride latices, polymethyl methacrylate latices, polybutylacrylate latices, polymethylacrylate latices and the like.

Latices which are preferred for use in the present invention are monovinylidene-alkenenitrile-rubber latices wherein monovinylidene-alkenenitrile-copolymer or monovinylidene or methyl methacrylate copolymer is grafted to an alkadiene rubber substrate. Alkadiene rubber substrates useful in monovinylidene-alkenenitrile-rubber latices include the conjugated 1,3-diene rubbers, ethylene-propylenediene terpolymer rubbers, acrylate-diene copolymer rubbers, and mixtures thereof. Preferred conjugated 1,3-diene rubbers include butadiene, isoprene, piperylene, chloroprene, and mixtures thereof. "Butadiene" copolymers are particularly preferred. Monovinylidene monomers useful in monovinylidene-alkenenitrile-rubber latices include aromatic hydrocarbon monomers and include the styrenes and aralkyl styrenes. Preferred are the alpha-alkyl styrenes, including alpha-methyl, and -ethyl styrene; and the meta and para methyl styrene and tertiary butyl styrene, and halomonovinylidene aromatics such as the chlorostyrenes; and the bromostyrenes such as 2,4-dibromostyrene. Particularly preferred are styrene and tertiary butyl styrene.

Alkenenitrile and other compounds useful in monovinylidene-alkenenitrile-rubber latices include acrylonitrile methacrylonitrile, alkyl acrylates and alkyl methacrylates. Acrylonitrile is particularly preferred.

EMULSIFIERS

A pH sensitive emulsifier is used as an emulsifying agent to stabilize the latex emulsion. The terminology "stable emulsion", as used herein, refers to a suspension in which the solids are sufficiently well suspended as to not precipitate within the process time. By the term "pH sensitive emulsifier" is meant that a significant portion of the emulsifying agent provides good emulsion stability at a pH above 7.5 but does not provide good emulsion stability at a lower pH, i.e., a pH of less than 7.5. This would, for example, exclude the pH insensitive salts of alkylbenzene sulfonic acids as the sole emulsifiers although the emulsifier package may contain up to 75% of the pH insensitive emulsifier in some cases, preferably up to about 50%. Useful emulsifiers include the sodium and potassium salts of the $C_8$ to $C_{18}$ saturated and unsaturated fatty acids. Preferred emulsifiers include the alkali metal salts of the $C_{14}$ to $C_{18}$ saturated fatty acids. Particularly preferred are the sodium and potassium salts of oleic, palmitic, stearic, myristic, linoleic, linolinic, and lauric acids. Mixtures of these salts may also be employed. These materials are employed at their art-established levels and are ordinarily employed at levels of about 0.02% to about 6.0%, by weight of the admixture; preferred levels are from about 0.4% to about 4.0%, by weight.

Rosin soaps are also preferred as emulsifiers and may be employed, alone or in combination with the sodium and potassium salts described above. Preferred among such rosin soaps is Dresinate 214, a product of Hercules, which comprises rosin soap (potassium salt of abietic acid at approximately 70-80% solids.) Such high solids solutions should be warmed with steam before use to reduce their viscosity.

If the addition of such levels of emulsifier does not result in an admixture having a pH of at least 7.5, the admixture may be brought into the critical pH range by the addition of an alkali. Suitable alkalis include potassium hydroxide (KOH), sodium hydroxide (NaOH), ammonium hydroxide ($NH_4OH$), sodium bicarbonate or mixtures thereof.

ADDITION OF CARBON DIOXIDE

In the practice of the present invention, carbon dioxide gas is employed to destabilize the emulsified latex which has been stabilized by a pH sensitive emulsifier. The purpose of the carbon dioxide is to lower the pH of the latex without introducing unwanted permanent ions into the latex and, hence, the gaseous carbon dioxide may be brought into contact with the latex as by injection into or passing through the latex by any conventional means and from any conventional source.

The optimum method and rate of contact between the latex and gaseous carbon dioxide can vary and will depend upon several factors so long as the contact is sufficient to obtain destabilization of the latex to facilitate shear coagulation thereof. The skilled artisan will appreciate that these factors will include the characteristics of the latex emulsion, the latex solids concentration, the concentration of specific emulsifier or emulsifier mixtures used, the latex particle size, particle size distribution and density, the pH of the stable latex, the timing of the injection, and the like. The amount of carbon dioxide added shall be sufficient to reduce the pH of the latex to about 6 to less than 7.5 and preferably from about 6.8 to about 7.2. The carbon dioxide injection rate will depend in part on the absorbtion rate of the latex which is effected by surface area and amount of mixing.

Use of carbon dioxide allows provision of both a product and an effluent which are substantially free from coagulating agent. This significantly reduces the deletorious physical effects that the residual contaminants (left by conventional coagulators or agglomerators) have on the final products.

Of course, other agents commonly used in emulsion polymerizing processes or high shear coagulation steps may also be employed herein so long as they are compatible with the method of this invention. They are generally used in the art-taught modes at their art-established levels. For example, the cross-linking of the diene rubber may be accomplished by employing up to 5.0 percent, by weight of the solids, of a cross-linking agent during polymerization of the rubber monomers. Various conventional water-soluble free radical polymerization initiators, such as persulfate, peroxy, and perazo catalysts, may also be employed. Other examples include chain transfer agents and other polymerization modifiers, such as tert-dodecyl mercaptan, n-octyl mercaptan, and the like. (They may act as both promoters and regulators.) Antioxidents and stabilizers, such as the alkylated phenol, may also be employed.

SHEAR COAGULATION

In the practice of the present invention, the latex solids are coagulated by shearing simultaneously with contacting the latex with carbon dioxide or just after contacting the latex with carbon dioxide. The shear can be provided by any conventional means; it is preferably provided by a means which generates a high shearing stress such as the high shear described in U.S. Pat. No. 4,299,952, Nov. 10, 1981 to Pingel, et al. which is specifically incorporated by reference herein. Preferably, the method of this invention is employed in the method described in the Pingel, et al. patent. The gaseous carbon dioxide can be added by direct injection into the shear coagulator or by mixing carbon dioxide with the steam feed into the shear coagulator of Pingel, et al. After the resin has coagulated, forming a paste, the paste can be further processed as in the Pingel, et al. patent. Any carbon dioxide in the resin solids can be readily removed by exposing the solids to heat, steam, vacuum or simply air.

The shear coagulation is preferably carried out at a desirable and convenient coagulation temperature. The exact temperature is not thought to be critical and may range from about 40° C. to about 140° C., preferably from about 80° C. to about 125° C.

The following examples are presented to further illustrate particularly preferred embodiments of the present invention.

EXAMPLE I

Preparation of Latex

A thoroughly cleaned, sealed, 200 gallon reactor is utilized.

A soap "master batch" is prepared by adding the following ingredients in step-wise fashion:

| Soap Master Batch | Parts by Weight |
| --- | --- |
| parts deionized water | 356.4 |
| parts sodium oleate | 12.2 |
| parts Dresinate 214 Solution (warmed with steam to reduce viscosity of 75% solids solution) | 38.0 |
| parts NaOH | 0.0204 |

Analysis of the master batch showed 9.5% solids content.

An initial "aqueous charge" is prepared by mixing:

| Aqueous Charge | Parts by Weight |
| --- | --- |
| parts water (deionized) | 54.600 |
| parts sodium persulfate | 0.450 |
| parts sodium bicarbonate | 0.500 |
| parts sodium hydroxide beads | 0.150 |
| parts Soap Master Batch | 6.00 |

A mixed monomer charge is prepared by mixing:

| Mixed Monomer Charge | Parts by Weight |
| --- | --- |
| parts styrene | 7.00 |
| parts acrylonitrile | 3.00 |
| parts tertiary dodecyl mercaptan | 0.25 |
| parts butadiene | 90.00 |

The initial Aqueous Charge is placed (pumped) into the reactor. Next, the Mixed Monomer Charge is added to the reactor, and agitation (100 rpm) initiated. The reactor is heated to about 65° C. bringing the pressure to about 120 psig. The reaction is allowed to progress for about 13 hours.

At 13 hours, 8 parts of the first shot of Soap Master Batch is added, and after 17 hours a second shot of the Soap Master Batch is added, consisting of 7 parts, and after 21 hours a two part addition of Soap Master Batch is made. As the reaction proceeds to consume butadiene, the pressure drops. At 82.5 psig, the temperature is elevated to 80° C. using a linear ramp. When 80° C. is reached, a fourth soap shot of 5 parts Soap Master Batch is added. The reaction continues until the pressure has dropped to 50 psig at 80° C. At this point, the following Pregraft Aqueous Charge is added.

| PREGRAFT AQUEOUS CHARGE | |
| --- | --- |
| | Parts by Weight |
| Soap Master Batch | 5.0 |
| deionized water | 15.4 |
| sodium persulfate | 0.050 |

Then a one hour continuous addition stream of the following pregraft monomer is added:

| Pregraft Monomer | Parts by Weight |
| --- | --- |
| styrene | 3.5 |

| Pregraft Monomer | Parts by Weight |
|---|---|
| acrylonitrile | 1.5 |
| tertiary dodecyl mercaptan | 0.050 |

The reaction continues for 2 hours and then the remaining butadiene is purged. The total charged to the reactor was 209.35 parts or 684 pounds. The reactor was sampled periodically and the pH was as follows:

| Hours | pH |
|---|---|
| 5 | 10.0 |
| 7 | 9.95 |
| 9 | 10.0 |
| 13 | 9.95 |
| 17 | 10.0 |
| 21 | 10.0 |

Total reaction time for the rubber was about 35 hours.

Graft Polymerization

The following compositions are made up in separate tanks.

| | Parts by Weight |
|---|---|
| Initial Aqueous Shot | |
| deionized water | 179.58 |
| sodium hydrosulfite | 0.080 |
| sodium hydroxide | 0.080 |
| Grafting Monomer | |
| styrene (69.2%) | 69.2 |
| acrylonitrile (30.8%) | 30.8 |
| n-octyl mercaptan (1.0 pph) | 1.00 |
| Aqueous Con Add | |
| deionized water | 94.100 |
| sodium persulfate | 0.400 |
| sodium bicarbonate | 0.300 |
| sodium hydroxide | 0.100 |
| Calsoft (43% active solution of sodium dodecylbenzenesulfonate in water) | 2.326 |
| Antifoam Shot | |
| Antifoam FG-10 | 2.00 |
| deionized water | 4.000 |

The rpm is lowered to 60 and the temperature of the reactor is lowered to 70° C. and the above Initial Aqueous Shot is pumped into the reactor. Immediately thereafter, both the above Aqueous Charge and Mixed Monomer Charge are started and added at a uniform rate over a one hour period at 60.2 lbs/hr and 62.4 lbs/hr. After a 10 minute pause to wait for an exotherm to develop, both streams were restarted for four additional hours. When these additions are complete, a one-half hour cook-down is allowed. The antifoam shot is added and the latex is transferred to a still for residual monomer removal by steam stripping.

The latex is then transferred to a water cooled vessel and cooled. The cooled latex is then stabilized with an emulsion of:

| | Parts by Weight |
|---|---|
| Calsoft solution (43%) | 0.18 |
| Topanol CA[1] | 0.33 |
| DLTDP[2] | 1.0 |
| Polyguard[3] | 1.0 |

| | Parts by Weight |
|---|---|
| water | to 15% solids |

[1]1,1,3,tris(2-methyl-5-t-butyl-4-hydroxylphenol)butane from I.C.I. Ltd.;
[2]dilaurylthiodipropionate from Cincinnati-Milacron; and
[3]tri (mixed mono+dinonyl phenyl phosphite).

Shear Coagulation

A portion of the stabilized latex, having a pH of about 9.3 is then pumped into the shear coagulator disclosed in U.S. Pat. No. 4,299,952, Nov. 10, 1981 to Pingel, et al. and specifically incorporated by reference herein. The shear coagulator is of the generally horizontal drum variety having internal blades which rotate about the axis of the drum, the blades having a clearance from the drum of about one-eighth of an inch. Carbon dioxide is injected into the latex immediately upstream of the shear coagulator. The carbon dioxide is injected under a pressure and in a quantity sufficient to lower the pH of the latex to about 7.0. The temperature of the latex and the rotational speed of the shear coagulator are adjusted to provide a paste-like effluent containing coagulated latex. The effluent is then dewatered and the resin product recovered using the apparatus and procedures of the above-mentioned U.S. Pat. No. 4,299,952.

Another portion of the above stabilized latex is placed in a Waring blender with and without addition of gaseous carbon dioxide with the following results:

| | pH | Time to Coagulation | Clarity of Extracted Water |
|---|---|---|---|
| without $CO_2$ addition | 9.3 | 133 seconds | opaque |
| with $CO_2$ addition | 7.0 | 7 seconds | translucent |

EXAMPLE II

Preparation of Latex

A thoroughly cleaned, sealed, 200 gallon reactor is utilized.

A soap "master batch" is prepared by adding the following ingredients in step-wise fashion:

| Soap Master Batch | Parts by Weight |
|---|---|
| parts deionized water | 356.4 |
| parts sodium oleate | 12.2 |
| parts Dresinate 214 Solution (warmed with steam to reduce viscosity of 75% solids solution) | 38.0 |
| parts NaOH | 0.352 |

An initial "aqueous charge" is prepared by mixing:

| Aqueous Charge | Parts by Weight |
|---|---|
| parts water (deionized) | 54.600 |
| parts sodium persulfate | 0.450 |
| parts sodium bicarbonate | 0.500 |
| parts sodium hydroxide beads | 0.150 |
| parts Soap Master Batch | 5.50 |
| parts versene 100 | 0.064 |

A mixed monomer charge is prepared by mixing:

| Mixed Monomer Charge | Parts by Weight |
|---|---|
| parts styrene | 7.00 |
| parts acrylonitrile | 3.00 |
| parts tertiary dodecyl mercaptan | 0.25 |
| parts butadiene | 90.00 |

The initial Aqueous Charge is placed (pumped) into the reactor. Next, the Mixed Monomer Charge is added to the reactor, and agitation (115 rpm) initiated. The reactor is heated to about 65° C. and the pressure brought to about 120 psig. The reaction is allowed to progress for about 10 hours.

At 10 hours, 8 parts by weight of the Soap Master Batch is added to the reactor and the agitator is slowed from 115 to 60 rpm. As the reaction proceeds to consume butadiene, the pressure drops. At 85 psig a constant addition stream containing the following is added over 10 hours.

| | Parts by Weight |
|---|---|
| 10% rosin soap solution | 11.500 |
| deionized water | 147.600 |
| sodium persulfate | 0.120 |

Four hours after initiating addition of the above, the reactor temperature is increased from 65° C. to 80° C. using a 6 hour linear ramp. The reaction continues until the pressure has dropped to 50 psig at 80° C. At this point, the following Pregraft Aqueous Charge is added:

| Pregraft Aqueous | Parts by Weight |
|---|---|
| Soap Master Batch | 5.000 |
| deionized water | 15.400 |
| sodium persulfate | 0.050 |
| sodium hydroxide beads | 0.025 |

Then a one hour continuous addition stream of the following pregraft monomer is added:

| Pregraft Monomer | Parts by Weight |
|---|---|
| styrene | 3.600 |
| acrylonitrile | 1.400 |
| n-octyl marcaptan aqueous | 0.045 |

The reaction continues for 2 hours and then the remaining butadiene is purged. The total charged to the reactor was 206.47 parts or 814 pounds.

Graft Polymerization

The following compositions are made up in separate tanks.

| | Parts by Weight |
|---|---|
| Initial Aqueous Shot | |
| deionized water | 2.920 |
| sodium hydrosulfite | 0.080 |
| sodium hydroxide | 0.080 |
| Grafting Monomer | |
| styrene (72%) | 75.990 |
| acrylonitrile (28%) | 29.550 |
| n-octyl mercaptan (0.900 pph) | 0.950 |
| Aqueous Con Add | |
| deionized water | 94.100 |
| sodium persulfate | 0.400 |
| sodium bicarbonate | 0.300 |
| sodium hydroxide | 0.100 |
| Calsoft (43% active solution of sodium dodecylbenzene-sulfonate in water) | 2.326 |
| Antifoam Shot | |
| Antifoam FG-10 | 2.00 |
| deionized water | 4.000 |

The temperature of the reactor is lowered to 70° C. and the above Initial Aqueous Shot is pumped into the reactor. Immediately thereafter, both the above Aqueous Charge and Mixed Monomer Charge are started and added at a uniform rate over a six hour period. When these additions are complete, a one-half hour cookdown is allowed. The antifoam shot is added and the latex is transferred to a still for residual monomer removal by steam stripping.

The latex is then transferred to a water cooled vessel and cooled. The cooled latex is then stabilized with an emulsion of:

| | Parts by Weight |
|---|---|
| Calsoft solution (43%) | 0.18 |
| Topanol CA | 0.33 |
| DLTDP | 1.0 |
| polyguard | 1.0 |
| water | to 15% solids |

Shear Coagulation

A portion of the stabilized latex, having a pH of about 9.8, is then pumped into the shear coagulator disclosed in U.S. Pat. No. 4,299,952, Nov. 10, 1981 to Pingel, et al. and specifically incorporated by reference herein. The shear coagulator is of the generally horizontal drum variety having internal blades which rotate about the axis of the drum, the blades having a clearance from the drum of about one-eighth of an inch. Carbon dioxide is injected into the latex immediately upstream of the shear coagulator. The carbon dioxide is injected under a pressure and in a quantity sufficient to lower the pH of the latex to about 7.0. The temperature of the latex and the rotational speed of the shear coagulator are adjusted to provide a paste-like effluent containing coagulated latex. The effluent is then dewatered and the resin product recovered using the apparatus and procedures of the above-mentioned U.S. Pat. No. 4,299,952.

Another portion of the above stabilized latex is placed in a Waring blender with and without addition of carbon dioxide with the following results:

| | pH | Time to Coagulation in Waring Blender | Clarity of Extracted Water |
|---|---|---|---|
| without $CO_2$ addition | 9.8 | 219 seconds | opaque |
| with $CO_2$ addition | 7.0 | 4 seconds | slight haze |

What is claimed is:

1. A process for shear coagulating a latex resin to form a paste-like product, comprising the steps of:
   (A) providing a latex stabilized with a pH sensitive emulsifier mixture and having a pH above 7.5;

(B) destabilizing said latex by contacting said latex with gaseous carbon dioxide; and (C) subjecting said latex to high shear in an amount sufficient to coagulate said latex.

2. The process of claim 1 wherein step (C) is performed sequentially after step (B).

3. The process of claim 1 wherein step (C) is performed simultaneously with step (B).

4. The process of claim 1 wherein the pH sensitive emulsifier is selected from the group consisting of alkali metal salts of saturated and unsaturated fatty acids having from about 8 to about 18 carbon atoms, and mixtures thereof; and such pH sensitive emulsifiers are at least 25% of the total emulsifier package.

5. The process of claim 1 wherein said emulsifier is selected from the group consisting of the sodium and potassium salts of oleic, palmitic, stearic, myristic, linoleic, linolinic, and lauric acids, and mixtures thereof.

6. The process of claim 1 wherein said emulsifier is a rosin soap.

7. The process of claim 1 wherein the latex comprises the polymerized reaction product of styrene, acrylonitrile, and a butadiene.

8. The process of claim 1 wherein 90%, by weight, of the resin particles are in the range of about 800 Å to about 20,000 Å.

9. The process of claim 1 wherein the latex is saturated with carbon dioxide in step (B).

10. The process of claim 1 where any carbon dioxide remaining after step (C) is removed from said coagulated latex.

11. The process of claim 1 wherein said stabilized latex comprises from about 25% to about 60% solids.

12. The process of claim 1 wherein said resin is a grafted emulsion polymerization product of acrylonitrile, butadiene and styrene and said latex is stabilized by an emulsifier comprising an alkali metal salt of oleic acid.

13. The process of claim 12 wherein said latex has a pH of about 7.0 after step (B).

14. A process for coagulating a stabilized aqueous latex resin emulsion stabilized by an effective amount of a pH sensitive emulsifier and having a pH of from at least 7.5 to about 12.0 comprising the steps of:

(A) contacting said emulsion with gaseous carbon dioxide in an amount effective to lower the pH of said emulsion to a pH of from about 6.0 up to 7.5 at which said pH sensitive emulsifier is not effective to stabilize said emulsion; and (B) shear coagulating said latex to form a paste-like product.

15. The process of claim 14 wherein said stabilized emulsion has a pH of from about 9.0 to about 11.0 and said stabilized emulsion is contacted with gaseous carbon dioxide effective to lower the pH of said emulsion to from about 6.8 to about 7.2.

16. The process of claim 15 wherein step (B) is performed sequentially after step (A).

17. The process of claim 15 wherein step (B) is performed simultaneously with step (A).

18. The process of claim 15 wherein said emulsion comprises the polymerized reaction product of styrene, acrylonitrile and a butadiene.

19. The process of claim 15 wherein said emulsifier is selected from the group consisting of the sodium and potassium salts of oleic, palmitic, stearic, myristic, linoleic, linolinic, and lauric acids and mixtures thereof.

20. The process of claim 15 wherein said emulsifier is a rosin soap.

21. A latex resin product coagulated in accordance with the process of claim 1.

22. A latex resin product coagulated in accordance with the process of claim 15.

23. A latex resin product coagulated in accordance with the process of claim 19.

24. A latex resin product coagulated in accordance with the process of claim 20.

* * * * *